United States Patent
Smith et al.

(10) Patent No.: US 7,502,075 B1
(45) Date of Patent: Mar. 10, 2009

(54) VIDEO PROCESSING SUBSYSTEM ARCHITECTURE

(75) Inventors: David E. Smith, Allen, TX (US);
Deependra Talla, Plano, TX (US);
Ching-Yu Hung, Plano, TX (US)

(73) Assignee: Texas Instruments Incorporated, Dallas, TX (US)

(*) Notice: Subject to any disclaimer, the term of this patent is extended or adjusted under 35 U.S.C. 154(b) by 576 days.

(21) Appl. No.: 11/220,273

(22) Filed: Sep. 6, 2005

Related U.S. Application Data

(60) Provisional application No. 60/607,380, filed on Sep. 3, 2004.

(51) Int. Cl.
*H04N 5/14* (2006.01)
*H04N 9/64* (2006.01)

(52) U.S. Cl. .................. 348/571; 348/718; 348/719; 700/2; 700/5; 710/100

(58) Field of Classification Search .............. 348/571, 348/714–719, 655, 678; 700/2, 5; 710/100
See application file for complete search history.

(56) References Cited

U.S. PATENT DOCUMENTS

| | | | | |
|---|---|---|---|---|
| 5,461,679 A | * | 10/1995 | Normile et al. | 382/304 |
| 5,615,167 A | * | 3/1997 | Jain et al. | 365/230.08 |
| 5,634,037 A | * | 5/1997 | Sasaki et al. | 711/152 |
| 2003/0158608 A1 | * | 8/2003 | Ishikawa et al. | 700/2 |

\* cited by examiner

*Primary Examiner*—M. Lee
(74) *Attorney, Agent, or Firm*—Robert D. Marshall, Jr.; W. James Brady; Frederick J. Telecky, Jr.

(57) ABSTRACT

A video processing apparatus includes a plurality of processing modules, each performing an image processing function, and a central memory interface. The central memory interface accepts read and write memory the said plurality of processing modules and issues burst memory access requests to an external memory by gathering plural memory access requests from the processing modules.

6 Claims, 2 Drawing Sheets

VIDEO PROCESSING SUBSYSTEM ARCHITECTURE

CLAIM OF PRIORITY

This application claims priority under 35 U.S.C. 1.119(e) to U.S. Provisional Application No. 60/607,380 filed Sep. 3, 2004.

TECHNICAL FIELD OF THE INVENTION

The technical field of this invention is video and image processing module architecture.

BACKGROUND OF THE INVENTION

Imaging and video capabilities have become the trend in consumer electronics. Digital cameras, digital camcorders and video cellular phones are now common. Many other new gadgets are evolving in the market. These products require an efficient architecture with modules essential for video and image processing. These modules need to be connected in a modular way that is functionally flexible and efficient in silicon area, external memory bandwidth and design effort.

The prior art typically includes a digital signal processor (DSP) that provides the imaging and video capability. Imaging and video computation and data flow in the DSP poses multiple challenges of high data rate, heavy computation load and many variations of data flow. These video and imaging tasks require many processing stages. A typical system on chip (SOC) solution includes on-chip memory that is not large enough to hold each frame. The image is generally partitioned into blocks for movement among the processing stages. Sometimes each frame requires are multiple passes to an external memory, such as synchronous dynamic random access memory (SDRAM), due to algorithm dependency or hardware characteristics. Processing and traffic among multiple frames often overlap in a pipelined manner to increase processing throughput rate. This overlap complicates the data flow.

SUMMARY OF THE INVENTION

This invention includes hardware processing modules for essential image processing algorithm steps and a centralized buffer scheme. The interface between processing modules and the centralized buffer utilizes a virtual addressing interface that achieves good design partition for design reuse. The multiple processing units are connected together to realize and manage complicated data flow. This invention makes efficient use of the amount of on-chip memory, external memory bandwidth and design effort by facilitating design reuse.

BRIEF DESCRIPTION OF THE DRAWINGS

These and other aspects of this invention are illustrated in the drawings, in which.

DETAILED DESCRIPTION OF PREFERRED EMBODIMENTS

Figure 1:
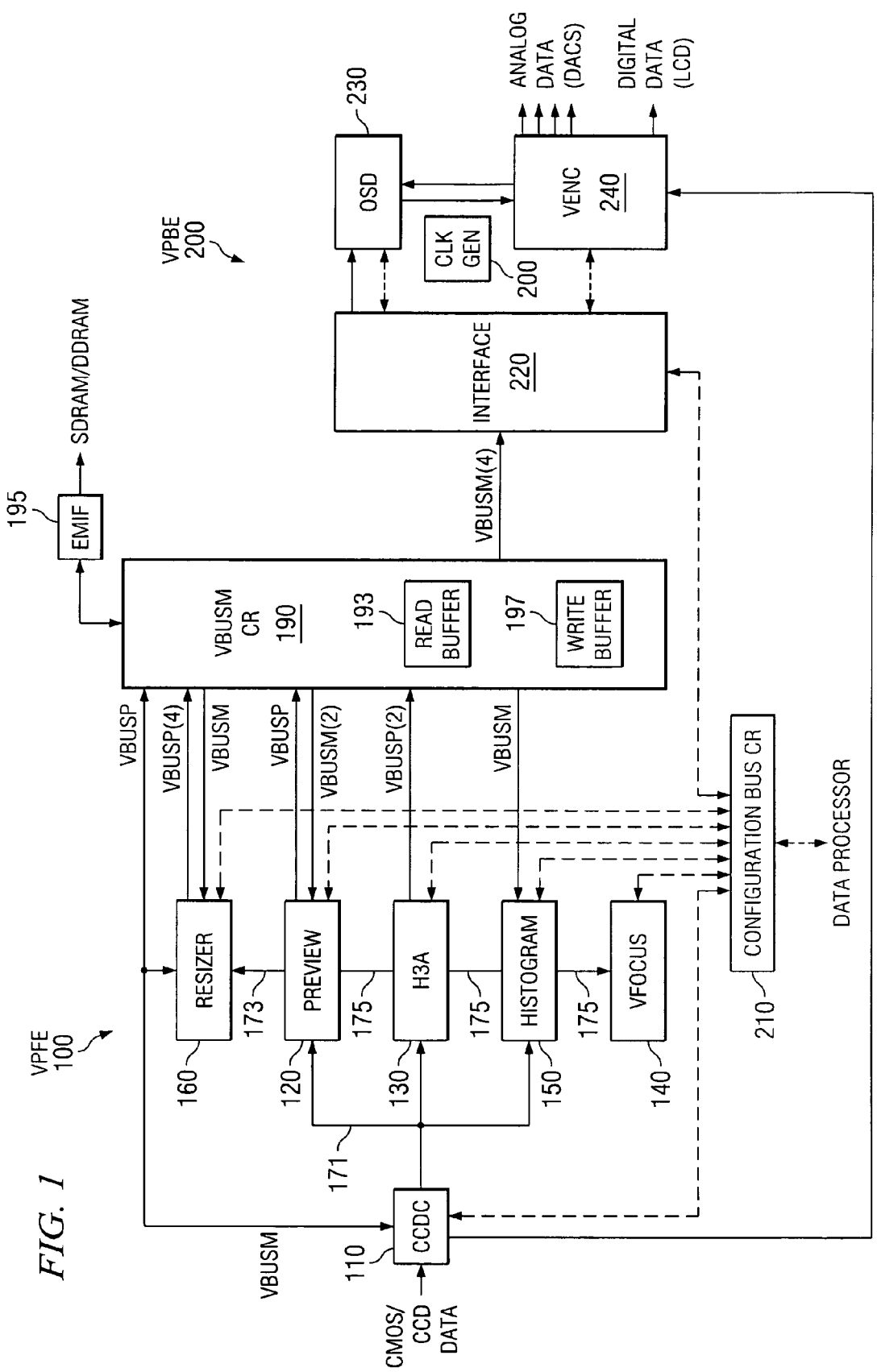
FIG. 1 illustrates the video processing subsystem (VPSS) architecture of this invention.

FIG. 1 illustrates the video processing subsystem (VPSS) architecture of this invention, which includes video processor front end (VPFE) 100 and video processor backend (VPBE) 200. VPFE 100 includes: CCD controller (CCDC) 110; preview module 120; H3A module 130; Vfocus module 140; histogram module 150; resizer module 160; Vbus module central resource (VBUSM CR) 190 which includes read buffer 193, write buffer 197 and is coupled to external memory interface (EMIF) 195. VPBE 200 includes: clock generator (clk gen) 200; configuration bus central resource (VBUSP CR) 210; interface 220; on-screen display (OSD) module 230; and video encoder module 240.

CCD controller 110 receives image data input from a charged coupled device (CCD) imager or from a complementary metal oxide semiconductor (CMOS) image sensor. CCD controller 110 formats the received data for processing. CCD controller 110 also performs imager related processing such as active region framing and black level subtraction.

Preview module 120 processes sensor data in image related functions. These image related functions include white balancing, noise filtering, CFA interpolation, color blending, gamma correction and color space transformation.

H3A module 130 handles auto exposure and auto white balancing (AE/AWB) statistics calculation and horizontal auto focus (AF) metrics computations.

Vfocus module 140 handles vertical auto focus computation. This is handled by a separate module from the horizontal auto focus (H3A module 130) because vertical focus requires data processed by portions of preview module 120. Therefore it is designed as a separate block than the H3A module 130 that receives data from CCD controller 110.

Histogram module 150 collects additional image statistics information over specified regions of the image such as image intensity histograms. These image statistics permit a data processor to adapt AE/AWB parameters according to scene and lighting conditions.

Resizer module 160 enables up/down size conversion of images. Thus images can be displayed or further processed at a different resolution than the input sensor data resolution.

The video processing subsystem architecture includes various busses. CCD controller 110 supplies data on the video port interface (VPI) bus 171 to preview module 120, H3A module 130 and histogram module 150. FIG. 1 further illustrates two one-to-one connections enabling processing blocks to communicate directly with one another. These connections allow selected blocks to be connected into a processing chain or network. Preview module 120 is directly connected to resizer module 160 via bus 173. Preview module 120 is also directly connected to Vfocus module 140 via bus 175.

These processing blocks are also tied to the VBUSM central resource (VBUSM CR) 190. VBUSM is a particular bus protocol adopted for this architecture. VBUSM CR 190 includes read buffer 193 and write buffer 197. Read buffer 193 and write buffer 197 allow efficient use of external memory bandwidth to synchronous dynamic random access memory (SDRAM) or dual rate dynamic access memory (DDRAM) though an external memory interface (EMIF) 195. The control mechanism for each processing module is autonomous to permit data rate regulated and concurrent dataflow. For example, VBUSM CR 190 may mediate the following simultaneous data flow paths: image sensor to CCD controller 110 to VBUSM CR 190 to EMIF 195 to SDRAM; SDRAM to EMIF 195 to VBUSM CR 190 to preview module 120 to resizer module 160 to VBUSM CR 190 to EMIF 195 to SDRAM; and SDRAM to EMIF 195 to VBUSM CR 190 to histogram module 150. The ability to chain processing steps and allow multiple concurrent autonomous threads of computation adds significant flexibility and power efficiency to devices that incorporate this subsystem architecture. These functions will be further explained below.

Clock generator (clk gen) 200 produces appropriate clock signals for all parts of the video processor including VPFE 100 and VPBE 200.

Configuration bus central resource 210 couples a data processor to the front end modules CCD controller (CCDC) 110, preview module 120, H3A module 130, Vfocus module 140, histogram module 150, resizer module 160 and the back end module interface 220. Configuration bus central resource 210 permits the controlling data processor to configure or re-configure the connected modules according to the next task to be performed.

VPBE 200 includes interface 220 connecting between VBUSM CR 190 and on-screen display (OSD) module 230 and video encoder (VENC) module 240. Interface 220 receives data from VBUSM CR 190 that controls an interactive display.

OSD module 230 handles addressing external memory for multiple display windows and mixing windows to produce video display data. OSD module 230 may also produce text data which may be viewed overlain upon the processed image data.

VENC module 240 provides processing necessary to convert image data to a particular display format. This processing may include framing of a video signal versus horizontal/vertical synchronization pulses and dealing with the multiple display formats the imaging device needs to support. These display formats may include the television standards: North American Television Standards Committee (NTSC) and Phase Alternating Line (PAL); and the various digital LCD formats, for example.

The processing blocks such as preview module 120, H3A module 130, Vfocus module 140, histogram module 150, resizer module 160 and interface 220 generate or demand external memory bandwidth in an uneven way. Sometimes a processing module will demand a lot of data transfer over a short period of time. However, in between such bursts the processing module may require little data. To make efficient use of external memory bandwidth, VBUSM CR 190 includes data buffering control and buffer memories read buffer 193 and write buffer 197.

This invention includes a virtual buffering scheme for the module-to-VBUSM CR interface to manage multiple data streams autonomously driven by each processing module to/from EMIF 195. Transfers between the processing module and VBUSM CR 190 follow the VBUSM protocol as if the processing module is addressing EMIF 195 directly. For example, a display buffer in the external SDRAM is defined to be hex 800:0000 to hex 807:FFFF (512 Kbytes) in the system memory map. Resizer 160 writing out to this display buffer would just formulate its transfers as:

hex 800:0000 to hex 800:000F
hex 800:1000 to hex 800:000F
hex 800:2000 to hex 800:000F
hex 800:0010 to hex 800:001F
hex 800:1010 to hex 800:101F
hex 800:2010 to hex 800:201F
hex 800:0020 to hex 800:002F VBUSM CR 190 manages data buffering with a tagging scheme like a processor's data cache. Plural transfers are put together to form a bigger linear transfer to make use of SDRAM burst transfers.

For example, the data transfers hex 800:0000 to hex 800:000F, hex 800:0010 to hex 800:001F and hex 800:0020 to hex 800:002F should be linked together to form one DSRAM burst data transfer to the extent that EMIF 195 allows.

Data transferred out to EMIF 195 or back to a processing module will be de-allocated, while new data from EMIF 195 or a processing module will be allocated. The buffer allocation and de-allocation capabilities are part of VBUSM CR 190.

It is not feasible to connect plural processing modules directly to EMIF 195 because:

a) There are multiple processing modules that need to utilize EMIF 195;

b) The processing modules often inherently address multiple chunks of data in an interleaved manner, while expedient data transfer with the typical external memory (SDRAM) would favor large burst transfers. Thus direct connection would result in poor SDRAM bandwidth utilization.

Figure 2:
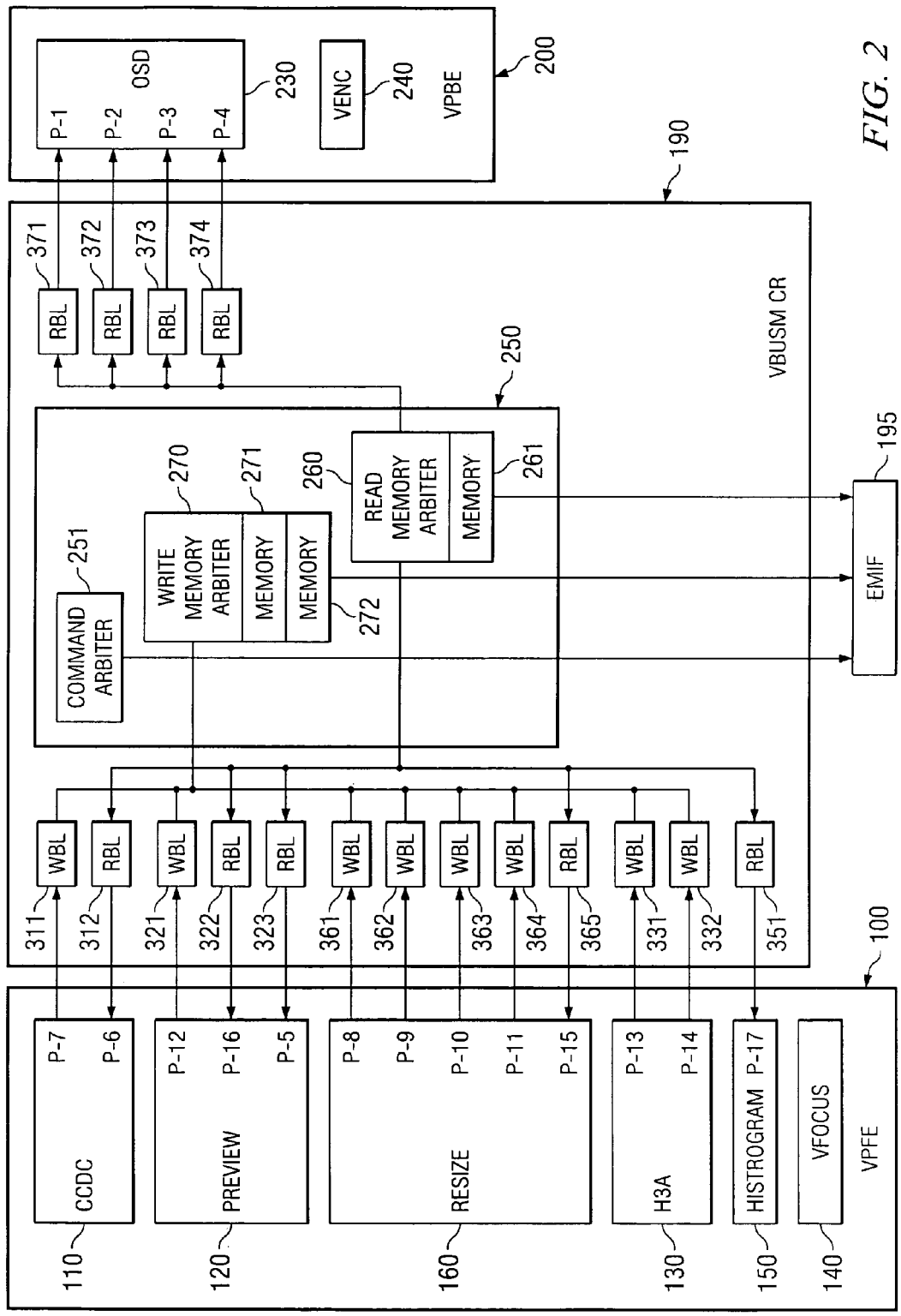
FIG. 2 illustrates the video processing subsystem (VPSS) architecture of this invention with further detail in the memory interface central resource.

FIG. 2 illustrates how VBUSM CR 190 interfaces with the various parts including VPFE 100, VPBE 200 and EMIF 195. VBUSM CR 190 is a unique block tailored to seamlessly integrate the VPSS into an image/video processing system. VBUSM CR 190 acts as the primary data source or sink to all VPFE 100 and VPBE 200 modules that interface from/to the SDRAM/DDRAM. In order to efficiently utilize the external SDRAM/DDRAM bandwidth, VBUSM CR 190 couples to a direct memory access (DMA) unit within EMIF 195 via a high bandwidth bus (64-bit). VBUSM CR 190 also couples to VPFE 100 and VPBE 200 modules via a 128-bit wide bus. VBUSM CR 190 includes arbitration logic 250. Arbitration logic 250 includes command arbiter 251, read memory arbiter 260 with accompanying read buffer memory 261 and write memory arbiter 270 with accompanying write buffer memories 271 and 271. VBUSM CR 190 performs the following functions:

(1) Makes appropriate VBUSM requests to the DMA unit to either transfer to or request data from the SDRAM/DDRAM. The data input resides in read buffer memory 261, the data output resides in a write buffer memory 271 or 272;

(2) Interfaces with preview module 120 to collect output data from preview module 120 via in write buffer logic 321 (32-bit VBUSP port), transfer input data and dark frame subtract data to preview module 120 via read buffer logic 322 and 323 (128-bit VBUSM ports);

(3) Interfaces with CCDC module 110 to collect output data from CCDC module 110 via write buffer logic 311 (32-bit VBUSP port) and transfer fault pixel table data to CCDC module 110 via read buffer logic 312 (128-bit VBUSM port);

(4) Interfaces h3A module 130 to collect output data from h3A module 130 via write buffer logic 331 (AF data) and 332 (AE/AWB data) (128-bit VBUSP ports);

(5) Transfers input data to histogram module 160 via read buffer logic 351 (128-bit VBUSM port);

(6) Interfaces with resizer module 160 to collect output data from resizer module 160 via write buffer logic 361, 362, 363 and 364 (32-bit VBUSP ports) and transfer input data to resizer module 160 via read buffer logic 365 (128-bit VBUSM port); and (7) Interfaces with OSD module 230 to transfer input data to OSD module 230 via read buffer logic 371, 372, 373 and 374 (128-bit VBUSM ports).

VBUSM CR 190 includes arbiter 250 which arbitrates between memory access requests of all VPFE 100 modules, VPBE 200 modules and DMA unit based on fixed priorities. Arbiter 250 is designed to maximize the SDRAM/DDRAM bandwidth even though each of the individual VPFE 100 modules and VPBE 200 modules makes data writes/reads in smaller sizes than the burst width of SDRAM/DDRAM. Arbiter 250 is constructed based on a bandwidth analysis with an arbitration scheme for buffer memory between VPFE 100 modules, VPBE 200 modules and DMA unit interface needs customized for each system. Requests by the DMA unit have the highest priority to guarantee correct functionality. It is possible to lower the priority of the VPSS requests to DDR EMIF 195 by a register setting.

VBUSM CR 190 includes read buffer memory 261 (instantiated as a 448×64×2 BRFS memory) for satisfying read requests from the various modules sourced from the SDRAM/DDRAM. Each request going to EMIF 195 is for a transfer of 256 bytes. Each module owns a certain number of bytes in read buffer memory 261 depending on their read throughput requirements. These memory areas are statically assigned on 256 byte boundaries because 256 bytes denotes a data-unit. The modules with lower bandwidth/throughput requirements are assigned only 2 data-units per read port while the modules with higher bandwidth/throughput requirements are assigned 4 data-units per read port.

The example circuit of FIG. 2 includes the following read buffer assignments. CCDC module 110 gets 2 data-units (512 bytes or 32×64×2) for reading in the fault pixel correction table entries serviced by read buffer logic 312. Preview module 120 gets 4 data-units (1024 bytes or 64×64×2) for reading in the input data serviced by read buffer logic 322 and another 4 data-units (1024 bytes or 64×64×2) for reading in the dark frame subtract data serviced by read buffer logic 323. Resizer module 160 gets 4 data-units (1024 bytes or 64×64×2) for reading in the input data serviced by read buffer logic 364. Histogram module 150 gets 2 data-units (512 bytes or 32×64×2) for reading in the input data serviced by read buffer logic 251. OSD module 230 gets 4 data-units (1024 bytes or 64×64×2) for video window0 serviced by read buffer logic 371, 4 data-units (1024 bytes or 64×64×2) for video window1 serviced by read buffer logic 372, 2 data-units (512 bytes or 32×64×2) for graphics/overlay window0 serviced by read buffer logic 373 and 2 data-units (512 bytes or 32×64×2) for graphics/overlay window1 serviced by read buffer logic 374.

VBUSM CR 190 includes write buffer memory 271 (instantiated as 256×64×2) and write buffer memory 272 (instantiated as 192×64×2 BRFS memory) for satisfying write requests from the various modules with a destination of the SDRAM/DDRAM. Each request going to EMIF 195 is for a transfer of 256 bytes. Each module owns a certain number of bytes in write buffer memories 271 and 272 depending on their write throughput requirements. These areas are statically assigned on 256 byte boundaries. Modules with lower bandwidth/throughput requirements are assigned only 2 data-units per write port while modules with higher bandwidth/throughput requirements are assigned with 4 data-units per write port.

The example circuit of FIG. 2 includes the following write buffer assignments. Write buffer memory 271 is dedicated to the resizer module 160. Resizer module 160 gets 4 data-units (1024 bytes or 64×64×2) for writing out line1 serviced by writer buffer logic 361, 4 data-units (1024 bytes or 64×64×2) for writing out line2 serviced by writer buffer logic 362, 4 data-units (1024 bytes or 64×64×2) for writing out line3 serviced by writer buffer logic 363 and 4 data-units (1024 bytes or 64×64×2) for writing out line4 serviced by writer buffer logic 364.

Write buffer memory 272 is dedicated to CCDC module 110, preview module 120 and h3A module 130. CCDC module 110 gets 4 data-units (1024 bytes or 64×64×2) for writing output data serviced by write buffer logic 311. Preview module 120 gets 4 data-units (1024 bytes or 64×64×2) for writing output data serviced by write buffer logic 321. The h3A module 130 gets 2 data-units (512 bytes or 32×64×2) for writing out AF data serviced by write buffer logic 331 and a 2 data-units (512 bytes or 32×64×2) for writing out AE/AWB data serviced by write buffer logic 332.

Multiple write buffer logic (WBL) units interface between the respective module write ports and write buffer memories 271 and 272. One write buffer logic unit is provided per write port for a total of 8 WBLs. As described above resizer module WBLs 361, 362, 363 and 364 write to write buffer memory 271 while CCDC module WBL 311, preview module WBL 321 and h3A module WBL 331 and 332 write to write buffer memory 272.

Each WBL tracks all the corresponding data-units in write buffer memories 271 and 272. These may be either 2 or 4 data-units for each WBL in this example. Each WBL collects output data in either 32-bit width or 128-bit width from a write port of the corresponding module. Each WBL includes buffer registers which store data prior to transfer to write buffer memories 271 and 272. Each 32-bit WBL 311, 321, 361, 362, 363 and 364 has a 32-bit input side register, a 128-bit register for stacking 32-bit values and a 128-bit output side register interfacing with the corresponding write buffer memory. Each 128-bit WBL 322, 331 and 332 has a 128-bit input side register and a 128-bit output side register interfacing with the corresponding write buffer memory. Each WBL transfers output data to the corresponding write buffer memory via a 128-bit bus. These WBLs arbitrate with other WBLs to get access to the corresponding write buffer memory. These WBLs arbitrate with the DMA unit get access to EMIF 195. This arbitration is further detailed below.

Each module writing to a WBL is responsible to include the end of line and end of frame signals. The WBLs are responsible for generating DMA commands to EMIF 195 rather than the individual modules. A DMA command is issued in three scenarios: (1) if the write data crosses a 256-byte data-unit so that the next module write would go to a different data-unit, a DMA command issues to transfer to the SDRAM/DDRAM the prior data unit; (2) if an end of frame signal occurs, a DMA command issues to transfer to the SDRAM/DDRAM the current data-unit even if it is not filled up; and (3) if an end of line signal occurs and the start of the next line crosses a 256-byte data-unit boundary, a DMA command issues to transfer to the SDRAM/DDRAM the current data-unit.

Multiple read buffer logic (RBL) units interface between the respective module read ports and read buffer memory 261. One RBL unit is provided per read port for a total of 9 RBLs. Each RBL is responsible for tracking all the corresponding data-units in the read buffer memory with either 2 or 4 data-units for each RBL in this example. Each RBL is responsible for sending the input data (128-bits) to the read port of the corresponding module. Each RBL has two buffer registers inside prior to transferring to the corresponding module/read port. Each RBL includes a 128-bit input data register and a 128-bit output data register. Each RBL accepts input data from read buffer memory 261 via a 128-bit bus. Each RBL arbitrates with other RBLs to obtain access to read buffer memory 261 and the DMA unit interface to EMIF 195. This arbitration is further detailed below. Unlike the WBL, the RBL is not responsible for issuing the DMA commands to EMIF 195. This is the responsibility of each individual module.

A command arbiter arbitrates between the various VBUSM commands that are generated by the modules (reads) and the WBLs (writes). Table 1 illustrates the fixed arbitration priority among 17 different masters.

TABLE 1

| Priority Level | Transfer | Direction |
|---|---|---|
| 1 | OSD video window0 input | Read |
| 2 | OSD video window1 input | Read |
| 3 | OSD graphic/overlay window0 input | Read |
| 4 | OSD graphic/overlay window1 input | Read |
| 5 | preview engine dark frame subtract input | Read |
| 6 | CCDC fault pixel table input | Read |
| 7 | CCDC output | Write |
| 8 | resizer output line 1 | Write |
| 9 | resizer output line 2 | Write |
| 10 | resizer output line 3 | Write |
| 11 | resizer output line 4 | Write |
| 12 | preview engine output | Write |
| 13 | h3A (AF) output | Write |
| 14 | h3A (AE/AWB) output | Write |
| 15 | resizer input | Read |
| 16 | preview engine input | Read |
| 17 | histogram input | Read |

The four ports of resizer module 160 have another level of arbitration among themselves. If resizer output line 1 is the last of the four resizer ports to be written out, then resizer output line 2 wins the next arbitration among the four ports. Similarly, line 3 wins if previous line was output line 2, line 4 wins if previous line was output 3, and line 1 wins if previous line was output line 4. This applies when the corresponding output line is active.

Only a total of 8 VBUSM commands can be active at any given time. Once a new slot opens, the highest priority pending transfer request enters the command queue. While VBUSM CR 190 can support up to 16 outstanding commands from a single master, EMIF 195 can only contain up to 7 commands. Therefore the number of outstanding commands has been reduced from 16 to 7.

When a VBUSM command is active, the read memory arbiter 260 arbitrates among the various RBLs and write memory arbiter 270 arbitrates among the various WBLs. The VBUSM access either accepts or supplies 64-bits each DMA clock cycle. Since the VBUSM data width to EMIF 195 is 64-bits and the read/write buffer memory width is 128-bits, the RBLs/WBLs are guaranteed access to the read/write buffer memories at least once every other DMA clock cycle. Arbitration between the various RBLs to read buffer memory 261 follows the fixed arbitration scheme between the 9 possible masters noted above. Arbitration between the four WBLs of resizer module 160 to write buffer memory 271 follows the fixed arbitration scheme between the four WBL ports and the VBUSM command (lowest priority). Arbitration between CCDC module 110, preview module 120, h3A module 130 and the VBUSM command follow the fixed priority in that order.

Configuration bus central resource 210 generates all the individual module configuration bus signals to the various VPFE/VPBE modules. The configuration bus port for each module programs individual registers. Configuration bus central resource 210 has an input configuration bus port on the VPSS boundary. Table 2 shows the configuration bus data addresses of the various modules.

TABLE 2

| Module | Starting address |
|---|---|
| CCDC | 0x00000400 |
| Preview engine | 0x00000800 |
| Resizer | 0x00000C00 |
| Histogram | 0x00001000 |
| h3A | 0x00001400 |
| Vfocus | 0x00001800 |
| VPBE | 0x00002400 |
| VPSS/SBL registers | 0x00003400 |

This interface scheme simplifies implementation of the processing modules. This implementation removes data buffering from the processing module. This data buffering is handled in VBUSM CR 190. Such data buffering is necessary to optimize for the data transfer bandwidth of EMIF 195 and of the SDRAM. Thus the architecture of this invention is better partitioned for design reuse. The processing module will work across various future devices that have different EMIF/SDRAM characteristics using a separately tuned VBUSM CR 190.

The centralized buffer technique also reduces amount of total memory. The common memory can be sized to work with various data flow scenarios. On the other hand providing data buffering at each module-to-module connection requires each buffer needs to be tuned for its worst case scenario. A central buffer may discount the possibility of a worst case for all modules occurring simultaneously and thus require significantly less total memory.

What is claimed is:

1. A video processing apparatus comprising:
a plurality of processing modules, each processing module operable to perform an image processing function and to perform memory accesses via read memory access commands and write access memory command, each write access memory command including an end of line signal if said write access ends a scan line and an end of frame signal if said write access ends a frame;
a central memory interface connected to each of said plurality of processing modules and adapted for connection to an external memory, said central memory interface accepting read and write memory access requests from said plurality of processing modules and issuing burst memory access requests to the external memory by gathering plural memory access requests from said plurality of processing modules, whereby said central memory interface issues a burst write memory access if a write access memory command received from a processing module:
crosses a predetermined memory size boundary,
includes an end of frame signal, or
includes an end of line signal and a start of a next line crosses said predetermined memory size boundary.

2. The video processing apparatus of claim 1, further comprising:
an imager controller module having an input adapted to receive image data from an imager and a output directly connected to at least one of said plurality of processing modules, said output not directly connected to at least one other of said plurality of processing modules.

3. The video processing apparatus of claim 2, wherein:
said plurality of processing modules includes a preview module operable to perform at least one of the following functions on image data white balancing, noise filtering, CFA interpolation, color balancing, gamma correction and color space transformation; and said image controller module includes said output directly connected to said preview module.

4. The video processing apparatus of claim 3, wherein:

said plurality of processing modules further includes a resizer module directly connected to said preview module and operable to change a size of image data to a different size.

5. The video processing apparatus of claim 2, wherein:

said plurality of processing modules includes an H3A module operable to perform at least one of the following functions on image data auto exposure, auto white balancing and horizontal auto focus; and said image controller module includes said output directly connected to said H3A module.

6. The video processing apparatus of claim 2, wherein:

said plurality of processing modules includes a histogram module operable to calculate statistics upon image data; and said image controller module includes said output directly connected to said histogram module.

* * * * *